Feb. 23, 1965   J. JARRET ETAL   3,171,049
VARIABLE-RELUCTANCE ELECTRIC MACHINES
Filed Feb. 4, 1963   3 Sheets-Sheet 1

INVENTORS
JEAN JARRET & JACQUES JARRET
BY
Abraham A. Saffitz
ATTORNEY

INVENTORS
JEAN JARRET & JACQUES JARRET
BY
Abraham A. Saffitz
ATTORNEY

000
United States Patent Office 3,171,049
Patented Feb. 23, 1965

3,171,049
VARIABLE-RELUCTANCE ELECTRIC MACHINES
Jean Jarret, La Champanelle, Chemin du Clos Baron, Fourqueux, France, and Jacques Jarret, 35 bis Ave. du Belloy, Le Vesinet, France
Filed Feb. 4, 1963, Ser. No. 255,904
Claims priority, application France, Feb. 5, 1962, 886,980; Nov. 28, 1962, 916,814
3 Claims. (Cl. 310—168)

The present invention relates to electric machines of the variable reluctance type and more particularly to machines of this kind in which the magnetic circuit includes saturated and unsaturated portions.

Variable reluctance electric machines are described in U.S. Patent No. 3,062,979 issued November 6, 1962 to the present applicants. In these machines the saturation induction in the rotor teeth magnetic material is reduced to between 15 and 85% of the maximal induction selected for the magnetic circuit material of the machine, thereby allowing magnetic fields of relatively large strength to be developed in the gaps adjacent the polar areas without excessive losses and promoting a high ratio of output power of the machine to its weight. With this object in view, the rotor teeth are constituted by alternate sheets of magnetic material which are interspersed with non-magnetic material, for example iron sheets which are separated by lamina-shaped airgaps.

In a typical variable-reluctance alternator according to our abovementioned patent, the stator comprises at least two identical pairs of pole projections, each pole having an angular development $a$ and the interpolar space having an angular development $b$ and the rotor comprises two teeth each subtending an angle $c$ equal to the sum of angles $a$ and $b$. Each stator pole carries a field winding. At two diametrically opposite points of the stator, the ends of two adjacent windings are connected together and to the terminals of a D.C. energization source; while at two other diametrically opposite points of the stator, the ends of two adjacent windings are connected together and to the terminals of the utilization load. In other words, the ends of two adjacent windings are connected together and are connected respectively to the four terminals of a bridge circuit, diametrically opposite by pairs so that the two diagonally disposed terminals of the bridge are the input D.C. terminals of the machine and the two other diagonally disposed terminals are the output A.C. terminals. As a result, the rates of flux variation produced in any pair of adjacent stator pole windings by the teeth displacement are equal, at any time, but are reversed. Consequently, the A.C. potential difference across the diagonal of the bridge, where the energization voltage is applied, is theoretically zero and all of the output power is theoretically available across the other diagonal.

However, satisfactory decoupling was not easily achieved in the abovementioned embodiment. Specifically the decoupling of the inductive action of the rotor teeth upon adjacent stator poles was not effectively realized and decoupling of the A.C. output and D.C. input circuits of the bridge was insufficient in order to obtain the desired efficiency.

It is an object of the present invention to provide an improved variable-reluctance electric machine of the type shown in our prior U.S. Patent No. 3,062,979 having a D.C. energization circuit and an A.C. circuit which are fully decoupled, and in accordance with the invention, the stator poles and the rotor teeth are respectively separated in two assemblies which are axially spaced apart, each of said assemblies comprising a half-stator having a given number of pairs of poles and a half-rotor having the same number of pairs of teeth.

More precisely, the rotor is divided, perpendicularly to its axis, into two coaxial half-rotors axially spaced apart and secured to each other and to a common rotatable shaft, each of said half-rotor having at least a pair of teeth made in a material the saturation induction of which has a first value, and the stator is divided into two identical, axially spaced apart half-stators, each of said half-stators cooperating with a given half-rotor and having as many pairs of poles as pairs of teeth in the co-operating half-rotor, each pole being made in a material the saturation induction of which has a second value significantly greater than said first value and carrying a field winding, a given winding in the first half-stator, a corresponding winding in the second half-stator, the winding opposite to said given winding in said first half-stator and the winding opposite to said corresponding winding in said second half-stator being serially connected in the manner of a four-impedance bridge, two pairs of serially connected windings pertaining to first and second half-stators being connected in parallel to a D.C. energization source and two pairs of serially connected windings opposite in a given half-stator being connected in parallel to the machine output. Thus two windings of the impedance bridge pertaining to two different half-stators will be "D.C. coupled" and two windings of the impedance bridge pertaining to the same half-stator will be "A.C. coupled." The arrangement between the poles and the teeth is such that the sum of the angular development of the part of a teeth of the first half-rotor beneath a first pole of the first half-stator and the angular development of the part of a teeth of the second half-rotor beneath a second pole of the second half-stator the winding of which is D.C. coupled to the winding of the first pole be, at any time, equal to the angular development of a pole.

When the machine is four-poled, each half-stator has two opposite poles and each half-rotor has two opposite teeth and it may be convenient to axially align the poles of the two half-stators and to space apart by $\pi/2$ the teeth of the two half-rotors. Thus, oriented-grain steel sheets (oriented electrical steel) can be used for the manufacture of the stator and the power versus weight of the machine can be increased.

An advantage of a two-pole alternator according to the invention in which the diagonal points of the bridge connected to the two pairs of serially connected D.C. coupled field windings are joined to the D.C. energization source and where the A.C. output voltage is derived from the diagonal points of the bridge connected to the two pairs of serially connected A.C. coupled field windings lies in the fact that the largest alternating output current amplitude is limited to the value of the D.C. energization current since for such a value the demagnetizing ampere-turns of the alternating current are equal to the magnetizing ampere-turns of the D.C. current. Thus, the machine may be short circuited without any damage.

It is to be noted that in the variable-reluctance machines of the prior art, the rotor teeth had constant magnetic properties over all their angular development. Particularly, since the teeth have a rectangular cross-sectional shape as do the stator poles, the increase of the magnetic flux when a tooth is moving past the leading edge of a stator pole and the decrease of said flux when the tooth is moving past the trailing edge of the pole are constant per time unit and proportional to the angular displacement of the rotor during said time, whereby electromotive forces produced in the field windings during the travel of the tooth beneath the pole take successively two opposite substantially constant values, at least when the machine runs light or with a slight load. The waveform of the induced voltage is thus substantially rectangular which is objectionable when the machine is used as an alternator for supplying a sinusoidal mains or as a synchronous motor connected to the sinusoidal supply mains.

A further object of the invention is to provide a variable-reluctance electric machine operating with a sine-wave current.

According to another feature of the invention, the rotor teeth are constituted by magnetic sheets spaced apart by spacers and having a circular shape with substantially sectoral projecting portions, the sectoral angle being lesser than the angular development of a stator pole and greater than half the said angular development, and the sectoral portions are fanned out so that the angular development of all the angularly spaced apart sectoral portions is equal to that of a pole or slightly lesser. As a result, the average magnetic material density per volume unit of a tooth is at a maximum near the tooth axis and drops off from this maximum value in stepwise decrements which are in proportion to the decrease of the number of projecting portions which are provided in the axial direction of the rotor from the central axis of the tooth on both sides of said axis; and on this basis, there is provided a stepwise change in magnetic characteristic with respect to the angular direction, whereby our variable-reluctance electric machine operates substantially with a sine-wave current.

The features of our invention which we believe to be novel are set forth with particularity in the appended claims. Our invention itself, however, both as to its structure and method of operation, together with further objects and advantages thereof, may best be understood by reference to the following description taken in connection with the accompanying drawings in which:

Figure 1:
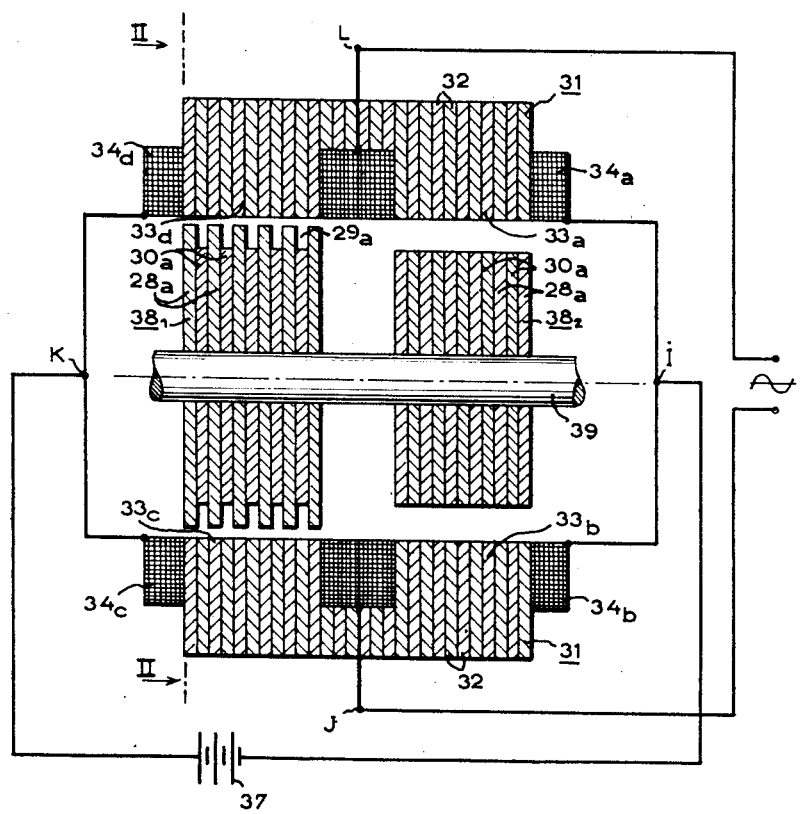
FIG. 1 is a simplified axially cross-sectional view of a four-pole alternator constructed in accordance with the invention.
Figure 2:
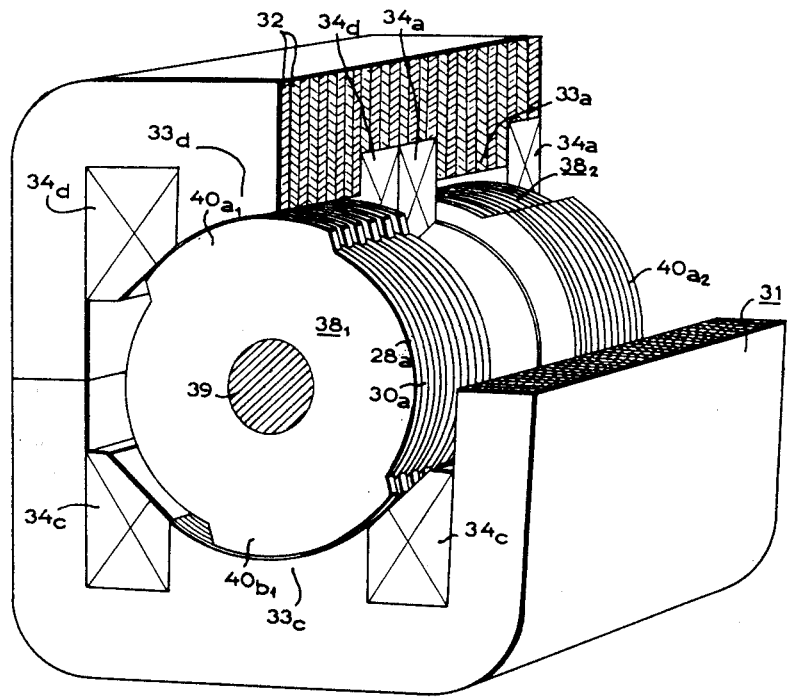
FIG. 2 is a perspective, partially cross-sectional, view of the alternator of FIG. 1, section being taken along line II—II of FIG. 1, the stator being partially broken away for allowing the rotor being seen.

Referring now to FIGS. 1 and 2, there is shown a stator 31 of a variable-reluctance alternator. It comprises a stack of magnetic sheets 32, which may be of the oriented-grain type, and it has four pole projections $33a$, $33b$, $33c$ and $33d$ each having an angular development of substantially $\pi/2$. Poles $33a$ and $33d$ are axially aligned, and similarly poles $33b$ and $33c$ are axially aligned and are respectively diametrically opposite poles $33a$ and $33b$. Each pole carries a field winding, respectively $34a$, $34b$, $34c$ and $34d$, said windings being identical to each other and the conducting wire thereof is so dimensioned as to allow both direct energization and alternating output currents to flow therein.

The rotor comprises two half-rotors $38_1$ and $38_2$ secured on a common rotatable shaft 39. Each of said half-rotor is constituted according to the teachings of the above-mentioned patent by a stack of magnetic sheets, $28a$ and $30a$, sheets $30a$ being circular in shape and sheets $28a$ being generally circular in shape but having two diametrically opposite sectoral projecting portions substantially $\pi/2$ wide, so that laminated airgaps $29a$ separate the portions of sheets $28a$ which project farther than sheets $30a$. The projecting portions of sheets $28a$ are axially aligned in each half-rotor and form teeth $40_{a1}$ and $40_{b1}$ in half-rotor $38_1$ and teeth $40_{a2}$ and $40_{b2}$ in half-rotor $38_2$. Teeth $40_{a1}$ and $40_{b1}$ of half-rotor $38_1$ are angularly spaced apart by $\pi/2$ from teeth $40_{a2}$ and $40_{a2}$ of half-rotor $38_2$.

As a result of this arrangement the sum of the angular developments of the fraction of the teeth $40_{a1}$, $40_{a2}$ on the one hand, and $40_{a2}$, $40_{b2}$ on the other hand, engaged beneath a pole is constant and equal to $\pi/2$. In operation, when the motor is revolving, the variations of the magnetic flux produced in windings $34a$ and $34b$ are, at any instant, equal but reverse, as in like manner are the magnetic flux variations in windings $34b$ and $34c$. Consequently the electromotive force induced by these flux variations are equal but reverse, on the one hand in serially connected windings $34a$ and $34b$, and on the other hand in serially connected windings $34c$ and $34d$; and these two pairs of serially connected windings can be connected in parallel.

More precisely, the four windings $34a$, $34b$, $34c$, $34d$ are connected in an impedance bridge circuit I, J, K, L shown in FIG. 1. The energization D.C. current produced by the source 37 is applied to the diagonal connection points I, K between the two serially connected D.C. coupled windings $34a$, $34d$ on the one hand and $34b$, $34c$ on the other hand, connected in parallel. According to the utilization of the variable-reluctance machine, whether as an alternator or as a motor, the output or input of the A.C. current is connected to the diagonal connection points J, L between the two serially connected A.C. coupled windings $34a$, $34b$ in one group and $34c$, $34d$ in the other group, being connected in parallel. The alternating resulting voltage across the diagonal I, K of the bridge comprises in each branch $(34a+34d)$ and $(34b+34c)$ a positive voltage in windings $34a$ and $34b$ and an equal negative voltage in windings $34c$ and $34d$; the resulting voltage is equal to zero and no alternating current flows in diagonal I, K. In the same way, it may be shown that no direct current flows in diagonal J, L. The totality of the mechanical power applied to the rotor is transferred to the alternating power output with the exception of the inevitable losses in the steel sheets and in the conducting wires.

The improved result described in the foregoing paragraphs is due firstly to the fact that the teeth of rotor 38 are substantially completely saturated while the other parts of the alternator are not saturated magnetically and secondly to the physical separation of the magnetic circuits of poles $33a$ and $33d$ and teeth $40_{a1}$ and $40_{b1}$ in a first group and of poles $33b$ and $33c$ and teeth $40_{a2}$ and $40_{b2}$ in a second group.

Figure 3:
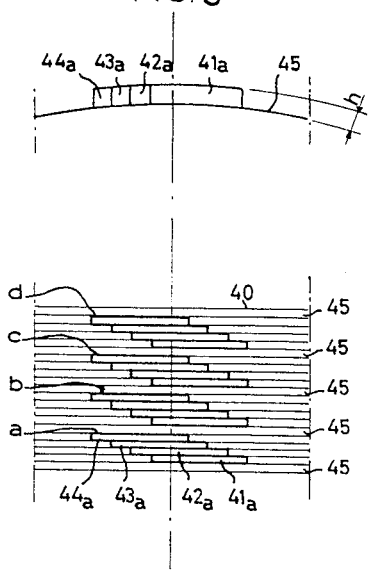
FIG. 3 is a simplified, side and front, view of a rotor tooth in accordance with the invention.

FIG. 3 shows a side view and a front view of the teeth of a rotor 40 constructed according to the invention. Each tooth comprises a plurality of fanned out sectoral projections $41_a$–$44_a$, $41_b$–$44_b$, $41_c$–$44_c$, $41_d$–$44_d$ made of iron sheet, each group of four sectoral projections being axially spaced apart from the adjacent one by a spacer sheet 45 having no projecting part. In each group the sectoral portions are angularly spaced apart by the fifth of their angular development so that the entire tooth has an angular development equal to eight fifths of the angular development of a sectoral projection.

It is easily deduced from FIG. 3 that, along the axis of the tooth, i.e. at the point where the passage of the tooth beneath a pole must give the upmost reluctance or flux variation, the density of the resultant magnetic material substantially corresponds to four magnetic laminae for one air lamina, i.e. a relative density approximately equal to $4/5$ of the density of the bulk material. In the second eighth part of the tooth on both sides of the axis, the average density corresponds to three magnetic laminae and two air laminae, i.e. $3/5$. In the third eighth part of the tooth on both sides of the axis, the average density is equal to $2/5$ and it is equal to $1/5$ over the fourth eighth part on both sides of the axis. The law of the average density of magnetic material per volume unit of the tooth thus better approximates a sine law than in FIG. 1.

Figure 4:
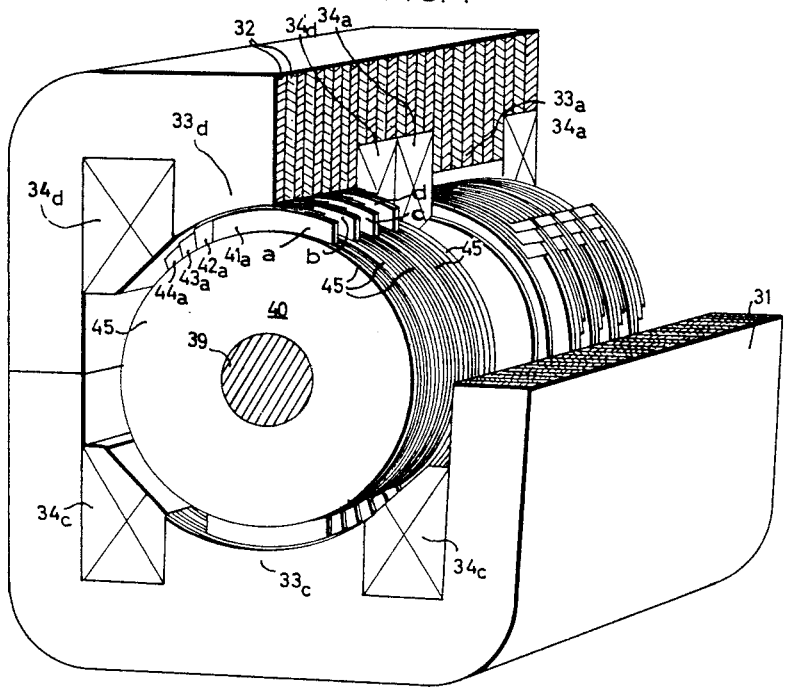
FIG. 4 is a perspective, partially cross-sectional, view of the alternator of FIG. 1 in which the teeth assume the structural form of FIG. 3.

FIG. 4 differs from FIG. 2 only in respect to rotor 40 whose teeth are of the type illustrated in FIG. 3. It is shown how the projections $41_a$, $42_a$, $43_a$, $44_a$ are spaced apart in a fan-like manner and how the groups of four projections are separated by non-projecting spacers 45.

What we claim is:

1. A variable-reluctance electrical machine comprising a stator longitudinally divided into a first part and a second part, at least two pairs of poles respectively on each part of said stator, said poles having an equal angular extent as measured around the rotor axis and each pole being provided with a magnetizing winding, a rotor axially divided into a first half-rotor and a second half-rotor, both of said half-rotors being integral with each other and at least two pairs of magnetic teeth which project from said first and second half-rotors in close proximity with the poles of the first and second parts of said stator respectively to coact with the field created by said windings, each of said half-rotors having a number of pairs of teeth equal to the number of pairs of poles of each of said stator parts and each tooth being constructed from a set of spaced groups of strip elements of magnetic material which are angularly displaced in a fan-like assembly so as to take up together an angular extent substantially equal to the angular extent of said poles and to provide in each tooth an average density of magnetic material per volume unit decreasing gradually from about 80% near the central axis of the tooth to about 20% at both lateral parts of the tooth.

2. A variable-reluctance electrical machine comprising a stator longitudinally divided into a first part and a second part, at least two pairs of poles respectively on each part of said stator, said poles having an equal angular extent as measured around the rotor axis and each pole being provided with a magnetizing winding, a rotor axially divided into a first half-rotor and a second half-rotor, both of said half-rotors being integral with each other and at least two pairs of magnetic teeth which project from said first and second half-rotors in close proximity with the poles of the first and second parts of said stator respectively to coact with the field created by said windings, each of said half-rotors having a number of pairs of teeth equal to the number of pairs of poles of each of said stator parts and comprising a stack of a first and a second plurality of strips of magnetic material in a plane normal to the rotor axis, each strip of said first plurality being shaped to provide substantially rectangular projecting portions having an angular extent less than the angular extent of said poles and greater than half of the same and each strip of said second plurality being circular and utilized as a spacer between groups of strips of said first plurality and each tooth being formed by the combination of at least one group of said projecting portions which are angularly displaced in a fan-like assembly so as to take up together an angular extent substantially equal to the angular extent of said poles and to provide in each tooth an average density of magnetic material per volume unit decreasing gradually from about 80% near the central axis of the tooth to about 20% at both lateral parts of the tooth.

3. A variable-reluctance electrical machine comprising a stator longitudinally divided into a first part and a second part, at least two pairs of poles respectively on each part of said stator, said poles having an equal angular extent as measured around the rotor axis and each pole being provided with a magnetizing winding one terminal of which is connected to the winding of the pole of the same pair and the other terminal of which is connected to the winding of a pole of the other of said stator parts, a rotor axially divided into a first half-rotor and a second half-rotor, both of said half-rotors being integral with each other, and at least two pairs of magnetic teeth which project respectively from said first and second half-rotors in close proximity with the poles of the first and second parts of said stator to coact with the field created by said windings, each of said half-rotors having a number of pairs of teeth equal to the number of pairs of poles of each of said stator parts and each tooth having an angular extent substantially equal to the angular extent of said poles, the sum of the angular extent of the portion of a first half-rotor tooth under a given pole and of the portion of a second half-rotor tooth under a pole the winding of which is connected to one terminal of the winding of said given pole being substantially equal to the angular extent of a pole, the average density of magnetic material included in a half-rotor tooth decreasing from the central axis of the tooth on both sides of the last said axis, each of said half-rotor comprising a stack of a first plurality and a second plurality of strips of magnetic material in a plane normal to the rotor axis, each strip of said first plurality being shaped to provide substantially rectangular projecting portions having an angular extent less than the angular extent of said pole and greater than half of the same and each strip of said second plurality being circular and utilized as a spacer between groups of strips of said first plurality, and wherein each tooth is formed by the combination of at least one group of said projecting portions being angularly displaced in a fan-like assembly so as to take up together an angular extent substantially equal to the angular extent of said poles and to provide the average magnetic material density per volume unit of the tooth decreasing from about 80% near the central axis of the tooth to about 20% at both lateral parts of the same.

References Cited by the Examiner

UNITED STATES PATENTS

| | | | |
|---|---|---|---|
| 2,108,662 | 2/38 | Fisher | 310—168 |
| 3,041,486 | 6/62 | Moffitt | 310—168 |
| 3,062,979 | 11/62 | Jarret et al. | 310—168 |

MILTON O. HIRSHFIELD, *Primary Examiner.*